US012701016B2

(12) United States Patent
Rakshit et al.

(10) Patent No.: US 12,701,016 B2
(45) Date of Patent: Aug. 4, 2026

(54) ISSUING DIGITALLY SIGNED QR CODES FOR VEHICLES

(71) Applicant: DigiCert, Inc., Lehi, UT (US)

(72) Inventors: Samir Kumar Rakshit, Bengaluru (IN); Avesta Hojjati, Austin, TX (US)

(73) Assignee: DigiCert, Inc., Lehi, UT (US)

( * ) Notice: Subject to any disclaimer, the term of this patent is extended or adjusted under 35 U.S.C. 154(b) by 254 days.

(21) Appl. No.: 18/513,896

(22) Filed: Nov. 20, 2023

(65) Prior Publication Data

US 2025/0119303 A1    Apr. 10, 2025

(30) Foreign Application Priority Data

Oct. 6, 2023    (IN) .............................. 202341067038

(51) Int. Cl.
*H04L 29/06*       (2006.01)
*G06K 19/06*       (2006.01)
*H04L 9/32*        (2006.01)

(52) U.S. Cl.
CPC ...... *H04L 9/3268* (2013.01); *G06K 19/06037* (2013.01); *H04L 9/3247* (2013.01)

(58) Field of Classification Search
CPC . H04L 9/3268; H04L 9/3247; H04L 2209/84; G06K 19/06037
See application file for complete search history.

(56) References Cited

U.S. PATENT DOCUMENTS

| | | | | |
|---|---|---|---|---|
| 5,351,302 | A | * 9/1994 | Leighton | ............ G06Q 20/3821 |
| | | | | 705/76 |
| 9,077,546 | B1 | 7/2015 | Rakshit | |
| 10,899,317 | B1 | * 1/2021 | Moeller | .................. B60R 25/30 |
| 11,032,265 | B2 | * 6/2021 | Klieman | ............. H04L 63/0823 |
| 11,727,795 | B1 | * 8/2023 | Shen | ................... G06F 21/6254 |
| | | | | 382/105 |
| 2003/0076961 | A1 | * 4/2003 | Kim | ........................ H04L 9/006 |
| | | | | 380/282 |
| 2005/0065886 | A1 | * 3/2005 | Andelin | ................ H04L 9/3247 |
| | | | | 705/50 |
| 2005/0201363 | A1 | * 9/2005 | Gilchrist | ............... H04L 51/212 |
| | | | | 370/352 |

(Continued)

FOREIGN PATENT DOCUMENTS

| | | | | | |
|---|---|---|---|---|---|
| CN | 109995737 | A | * 7/2019 | ............. | H04L 63/20 |
| CN | 110099037 | A | * 8/2019 | ......... | H04L 63/0428 |

(Continued)

*Primary Examiner* — Sher A Khan
(74) *Attorney, Agent, or Firm* — Baratta Law PLLC; Lawrence A. Baratta, Jr.

(57) ABSTRACT
Systems and methods for applying a digitally signed QR code to a vehicle are provided. In one implementation, a method includes the step of receiving, from a requesting entity, a Certificate Signing Request (CSR) and object-related information associated with an object. The method further includes the step of issuing a digital certificate to authenticate the object and/or the requesting entity. Also, the method includes the step of digitally signing a machine-detectable code configured to reference a database associated with the digital certificate and the object-related information. The method also includes the step of sending the digitally signed machine-detectable code to the requesting entity.

19 Claims, 6 Drawing Sheets

(56)     References Cited

U.S. PATENT DOCUMENTS

| | | | | |
|---|---|---|---|---|
| 2007/0185814 | A1* | 8/2007 | Boccon-Gibod | H04L 9/3242 |
| | | | | 705/51 |
| 2009/0092247 | A1* | 4/2009 | Kido | H04L 9/3263 |
| | | | | 380/30 |
| 2012/0179907 | A1* | 7/2012 | Byrd | H04L 9/3268 |
| | | | | 713/156 |
| 2017/0317997 | A1* | 11/2017 | Smith | H04L 9/3247 |
| 2017/0338967 | A1* | 11/2017 | Lewison | H04L 9/0643 |
| 2018/0186309 | A1* | 7/2018 | Batten | G09G 3/36 |
| 2019/0325125 | A1* | 10/2019 | Pantfoerder | H04W 8/005 |
| 2020/0137165 | A1* | 4/2020 | Garg | H04L 63/126 |
| 2021/0273819 | A1* | 9/2021 | Rueckriemen | H04L 9/3268 |
| 2021/0281421 | A1* | 9/2021 | Semenovskiy | G06Q 20/3276 |
| 2022/0417038 | A1* | 12/2022 | Kravitz | H04L 63/10 |
| 2023/0300129 | A1 | 9/2023 | Hojjati et al. | |

FOREIGN PATENT DOCUMENTS

| | | | | | |
|---|---|---|---|---|---|
| CN | 110546917 | A | * | 12/2019 | H04L 67/12 |
| KR | 20110137062 | A | * | 12/2011 | G06Q 50/40 |
| WO | WO-2010055691 | A1 | * | 5/2010 | G06Q 20/341 |
| WO | WO-2022228423 | A1 | * | 11/2022 | H04L 9/30 |

* cited by examiner

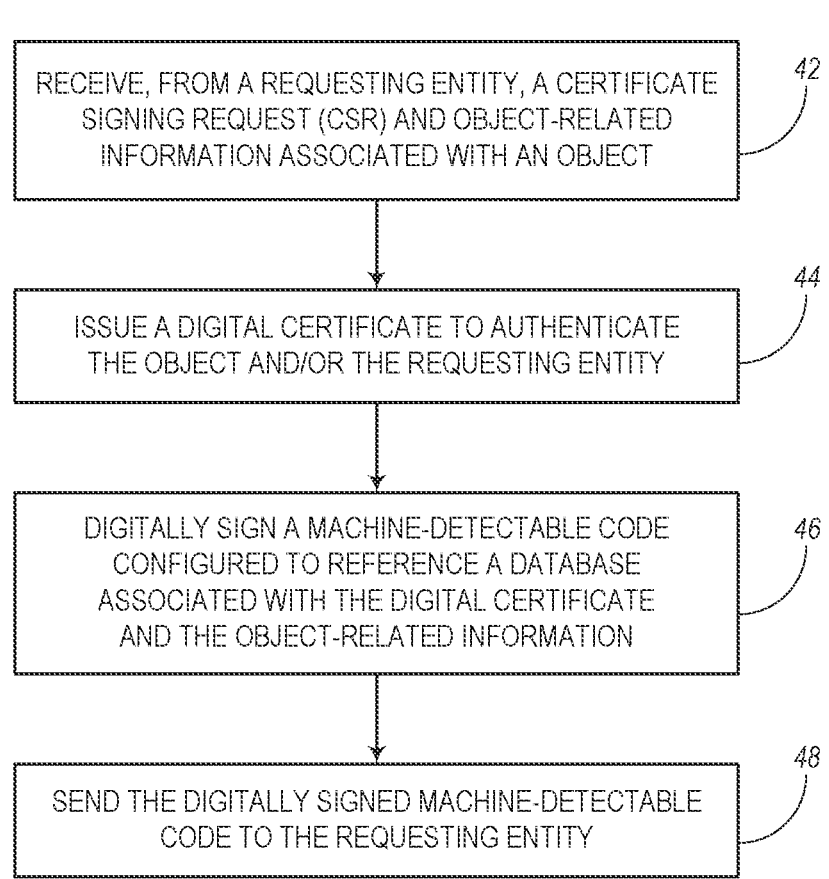

40

RECEIVE, FROM A REQUESTING ENTITY, A CERTIFICATE SIGNING REQUEST (CSR) AND OBJECT-RELATED INFORMATION ASSOCIATED WITH AN OBJECT   42

ISSUE A DIGITAL CERTIFICATE TO AUTHENTICATE THE OBJECT AND/OR THE REQUESTING ENTITY   44

DIGITALLY SIGN A MACHINE-DETECTABLE CODE CONFIGURED TO REFERENCE A DATABASE ASSOCIATED WITH THE DIGITAL CERTIFICATE AND THE OBJECT-RELATED INFORMATION   46

SEND THE DIGITALLY SIGNED MACHINE-DETECTABLE CODE TO THE REQUESTING ENTITY   48

MEMORY DEVICE *54*

OBJECT MONITORING
PROGRAM *66*

PROCESSING
DEVICE *52*

*62*

INPUT/OUTPUT
INTERFACES *56*

NETWORK
INTERFACE *58*

DATA
BASE *60*

NETWORK
*34*

70

SEND, TO A CERTIFICATE AUTHORITY (CA), A
CERTIFICATE SIGNING REQUEST (CSR) AND
OBJECT-RELATED INFORMAITON ASSOCIATED
WITH AN OBJECT BEING REGISTERED

72

RECEIVE, FROM THE CA, A MACHINE-DETECTABLE
CODE THAT HAS BEEN DIGITALLY SIGNED

74

INITIATE A PLACEMENT PROCEDURE
FOR APPLYING THE DIGITALLY SIGNED
MACHINE-DETECTABLE CODE TO THE OBJECT

76

*80*

*90*

ISSUING DIGITALLY SIGNED QR CODES FOR VEHICLES

FIELD OF THE DISCLOSURE

The present disclosure relates generally to computing networks and digital certification. More particularly, the present disclosure relates to systems and methods for issuing digitally signed Quick Response (QR) codes for automotive vehicles and applying the QR codes to the vehicles for identification and tracking.

BACKGROUND OF THE DISCLOSURE

Currently, police cars are often equipped with various devices for detecting vehicle speeds, running license plates, etc. These devices may be used to detect if vehicles are violating certain traffic laws. One type of device is part of an Automatic Number Plate Recognition (ANPR) system and can visually pick up alphanumeric characters of a license plate. In other situations, a police officer may type a license plate on a keyboard of a computing system attached to the dashboard of the patrol car. The detected license plate can be communicated to a central database that may be configured to store vehicle information, such as registration data, vehicles associated with pending traffic violations or other criminal activity, etc. One flaw with such a system is that license plates can easily be stolen and put on another vehicle (e.g., a stolen vehicle). Any information about the vehicle, in this scenario, will not match the database records associated with the detected license plate information. Although some information may be available to an officer, there is a need in this field for better security and reliability with respect to vehicle identification and tracking.

BRIEF SUMMARY OF THE DISCLOSURE

The present disclosure relates to systems and methods for digitally signing QR codes for vehicles. A certificate management system, according to one implementation, includes a processing device and a memory device configured to store a computer program. The computer program has logic that enables the processing device to receive, from a requesting entity, a Certificate Signing Request (CSR) and object-related information associated with an object. The logic also enables the processing device to issue a digital certificate to authenticate the object and/or the requesting entity. Furthermore, the logic enables the processing device to digitally sign a machine-detectable code configured to reference a database associated with the digital certificate and the object-related information. The logic also enables the processing device to send the digitally signed machine-detectable code to the requesting entity.

Also, an object registration system is provided. The object registration system includes a processing device and a memory device configured to store a computer program having logic that enables the processing device to send, to a Certificate Authority (CA), a Certificate Signing Request (CSR) and object-related information associated with an object being registered. The logic also enables the processing device to receive, from the CA, a machine-detectable code that has been digitally signed. In addition, the logic enables the processing device to initiate a placement procedure for applying the digitally signed machine-detectable code to the object.

According to additional embodiments, a detection device is arranged on or near a roadway. The detection device includes a camera configured to capture one or more images of a vehicle travelling along the roadway and a machine-detectable code applied to the vehicle. The detection device also includes a communication component configured to communicate with a vehicle registration system. When the camera captures a specific machine-detectable code, such as a QR code, the communication component is configured to communicate with a Certificate Authority (CA) to verify a digital signature of the specific machine-detectable code.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a flow diagram illustrating the functionality of the certificate management system of FIG. 2, according to various embodiments.

DETAILED DESCRIPTION OF THE DISCLOSURE

Again, the present disclosure relates to systems and methods for monitoring a plurality of objects (e.g., vehicles) in a particular environment (e.g., on the roadways). Although many of the examples of the present disclosure are related to the monitoring of vehicles, it should be noted that machine-detectable codes (e.g., Quick Response (QR) codes, barcodes, RFID codes, etc.) may be applied in any suitable form to any type of device or product. In particular, the machine-detectable codes may include a first portion that can easily be observed by a human. However, the machine-detectable codes, in some embodiments, may also include a second portion that is hidden or concealed from the human eye. For example, this hidden or concealed portion may be in the form of a steganographic image using an object steganography technique.

Regarding license plates, one example of a steganographic technique includes a technique of tilting one or more of the numbers or letters in a certain direction. Another example may include varying the color scheme of the alphanumeric characters or varying the RGB patterns in a predetermined manner. One example may include an intentionally generated imperfection in certain characters or background images. Still another example may include applying a background image or pattern with certain characteristics that may not be obvious to the human eye, but can be readable or observable by a software program. In order to further define the concept of steganography, other examples not related to license plates may include the use of invisible ink, playing an audio track backward, hiding information within noise or within seemingly random images or text, etc.

Figure 1:
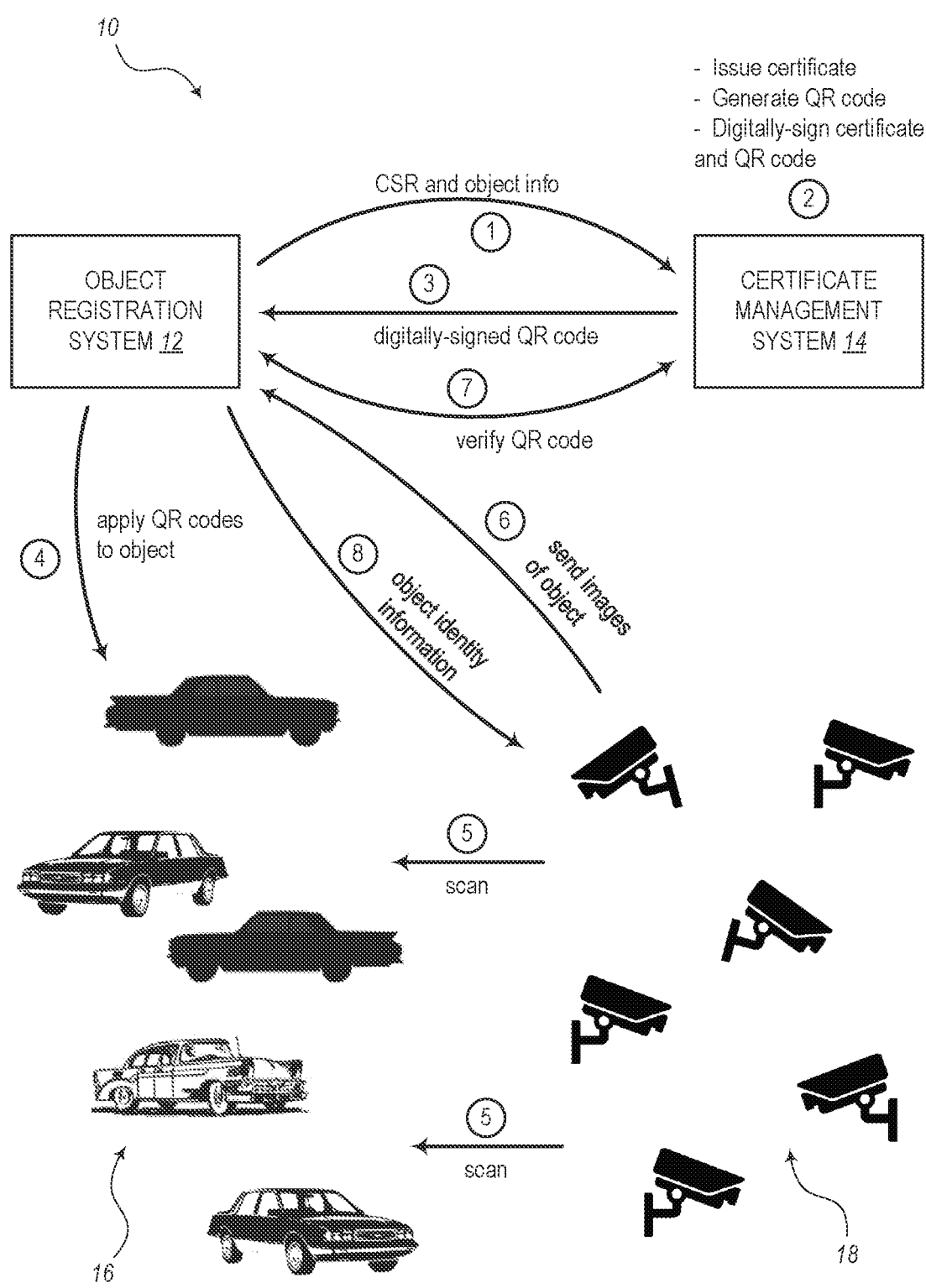
FIG. 1 is a diagram illustrating a vehicle monitoring system, according to various embodiments.

FIG. 1 is a diagram illustrating an embodiment of an object monitoring system 10 for monitoring and tracking objects and processing information related to the objects. As shown in this figure, the object monitoring system 10 includes at least an object registration system 12 and a certificate management system 14. In some embodiments, when the object monitoring system 10 is configured for monitoring vehicles, the object registration system 12 may be a vehicle registration system (e.g., Department of Motor Vehicles (DMV) system, vehicle title system, vehicle insurance system, vehicle manufacturing plant, etc.). The object monitoring system 10 further includes a plurality of object 16 (e.g., vehicles) and a plurality of cameras 18.

In operation, the object monitoring system 10 includes four main procedures that make up a set-up stage. Then, after set-up, a second stage may be run where the vehicles are monitored. In the set-up stage, a first procedure is performed in which a Certificate Signing Request (CSR) and object information is sent from the object registration system 12 to the certificate management system 14. Next, in a second procedure, the certificate management system 14 is configured to issue a certificate, generate a machine-detectable code (e.g., QR code) with a concealed steganographic image, and digitally sign the certificate and QR code. A third procedure includes the certificate management system 14 sending the digitally signed QR code to the object registration system 12.

Then, a fourth procedure includes the physical placement of the digitally signed QR code to the plurality of objects 16. In the field of automobiles, the QR codes can be applied directly to the vehicles (e.g., object 16) themselves, such as in a relatively inconspicuous spot on the vehicle, such as near the location where a license plate is attached. In some embodiments, however, the QR code can be applied to a roof, door, or other part of the vehicle. The QR code also alternatively be applied to a tag that can be attached to the license plate, which in turn can then be attached to the vehicle if not attached already. The tag can also be attached to the windshield of the vehicle or other part of the vehicle where it can be visually observed by the cameras 18. In other embodiments, the application of the QR code may include specifically creating license plates with the QR codes and steganographic images incorporated thereon. According to some embodiments, the QR codes and steganographic images may be applied to the vehicle separately. That is, the QR code can be placed on the license plate and the steganographic image may be applied to the vehicle itself (e.g., in a specific pattern in the paint, on a bumper, on a sticker attached to the windshield, etc.).

After the set-up stage (e.g., procedures 1 through 4), the object monitoring system 10 is configured to enable the execution of vehicle monitoring. For example, the fifth procedure includes allowing the cameras 18 to scan the objects 16. To monitor vehicles travelling along predefined roads, the cameras 18 can be arranged in a way where they are directed to where the vehicles are travelling. In some cases, one or more cameras 18 may be set up to capture an image of the entire vehicle while one or more other cameras 18 may be set up to capture the license plate and/or other areas of the vehicle where the QR code and/or steganographic image are applied. These cameras can work in coordination to scan multiple images of the vehicle at about the same time.

Next, in a sixth procedure, the cameras 18 are configured to send the captured images (e.g., full vehicle images, QR codes, steganographic images, etc.) of the objects 16 to the object registration system 12. The cameras 18 may already be set up for use in monitoring traffic and detecting traffic violations or the like. Then, in a seventh procedure, the object registration system 12 is configured to obtain the QR code and steganographic image and decode a Uniform Resource Locator (URL) address that references the certificate management system 14. In response, the object registration system 12 can send the decoded data to the certificate management system 14 to verify the QR code for determining whether the related vehicle information is legitimate. In some embodiments, the cameras 18 may be configured to access the certificate management system 14 directly, based on the decoded URL from the QR code, and obtain verification information regarding the vehicle.

The object registration system 12 can then compare prestored vehicle information (e.g., stored in a database) with observed vehicle information captured by the cameras 18, thereby determining if the encoded data about the vehicle matches the actual vehicle images. In some embodiments, the comparison information can be sent to a camera 18 positioned on a patrol car to inform the police officer that there is a mismatch and what type of mismatch has been detected. For example, the object registration system 12 may observe that vehicle information captured by the cameras 18 is related to blue Honda Accord, but the information stored in the database regarding the data associated with the particular QR code and steganographic image is related to a white Toyota RAV4. The procedures 5 through 8 may be repeated continuously to monitor vehicles at all times.

Figure 2:
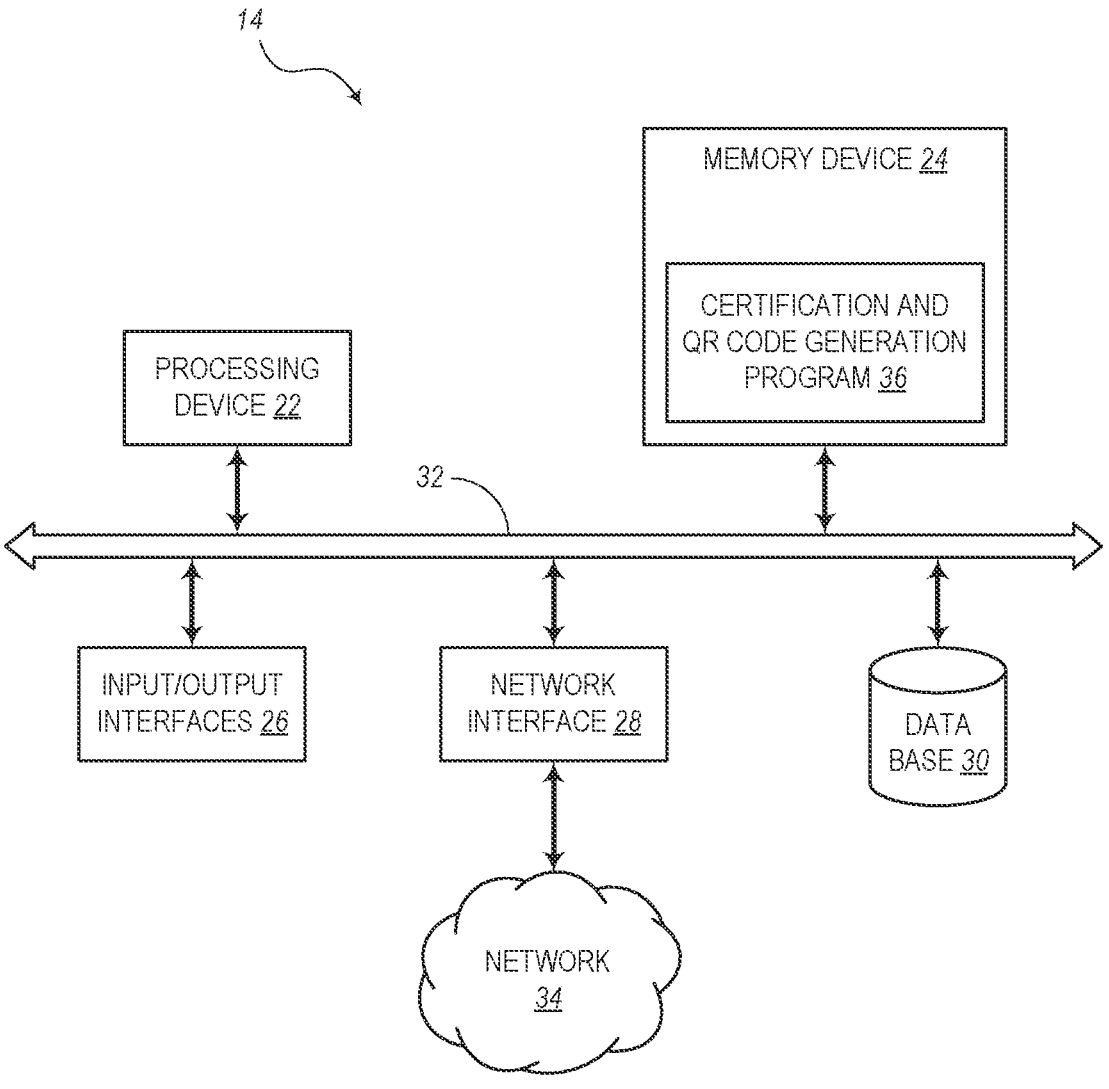
FIG. 2 is a block diagram illustrating the certificate management system shown in FIG. 1, according to various embodiments.

FIG. 2 is a block diagram illustrating an embodiment of the certificate management system 14 shown in FIG. 1. The certificate management system 14 may be a digital computer that, in terms of hardware architecture, generally includes a processing device 22 or processor, a memory device 24 or memory, input/output (I/O) interfaces 26, a network interface 28, and a database 30. It should be appreciated by those of ordinary skill in the art that FIG. 2 depicts the certificate management system 14 in an oversimplified manner, and a practical embodiment may include additional components and suitably configured processing logic to support known or conventional operating features that are not described in detail herein. The components (22, 24, 26, 28, and 30) are communicatively coupled via a local interface 32. The local interface 32 may be, for example, but not limited to, one or more buses or other wired or wireless connections, as is known in the art. The local interface 32 may have additional elements, which are omitted for simplicity, such as controllers, buffers (caches), drivers, repeaters, and receivers, among many others, to enable communications. Further, the local interface 32 may include address, control, and/or data connections to enable appropriate communications among the aforementioned components.

The processing device 22 is a hardware device for executing software instructions. The processing device 22 may be any custom made or commercially available processor, a Central Processing Unit (CPU), an auxiliary processor among several processors associated with the certificate management system 14, a semiconductor-based microprocessor (in the form of a microchip or chipset), or generally any device for executing software instructions. When the certificate management system 14 is in operation, the processing device 22 is configured to execute software stored within the memory device 24, to communicate data to and from the memory device 24, and to generally control operations of the certificate management system 14 pursuant to the software instructions. The I/O interfaces 26 may be used to receive user input from and/or for providing system output to one or more devices or components.

The network interface 28 may be used to enable the certificate management system 14 to communicate on a network 34, such as the Internet. The network interface 28 may include, for example, an Ethernet card or adapter or a Wireless Local Area Network (WLAN) card or adapter. The network interface 28 may include address, control, and/or data connections to enable appropriate communications on the network 34. A database 30 may be used to store data. The database 30 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the database 30 may incorporate electronic, magnetic, optical, and/or other types of storage media. In one example, the database 30 may be located internal to the certificate management system 14, such as, for example, an internal hard drive connected to the local interface 32 in the certificate management system 14. Additionally, in another embodiment, the database 30 may be located external to the certificate management system 14 such as, for example, an external hard drive connected to the I/O interfaces 204 (e.g., SCSI or USB connection). In a further embodiment, the database 30 may be connected to the certificate management system 14 through the network 34, such as, for example, a network-attached file server.

The memory device 24 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory device 24 may incorporate electronic, magnetic, optical, and/or other types of storage media. Note that the memory device 24 may have a distributed architecture, where various components are situated remotely from one another but can be accessed by the processing device 22. The software in memory device 24 may include one or more software programs, each of which includes an ordered listing of executable instructions for implementing logical functions. The software in the memory device 24 includes a suitable Operating System (O/S) and one or more programs. The O/S essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

Of note, the general architecture of the certificate management system 14 can define any device described herein. However, the certificate management system 14 is merely presented as an example architecture for illustration purposes. Other physical embodiments are contemplated, including virtual machines (VM), software containers, appliances, network devices, and the like.

In an embodiment, the various techniques described herein can be implemented via a cloud service. The certificate management system 14 may be a cloud-based server. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

In particular, the certificate management system 14 includes a certification and QR code generation program 36, which may be implemented in any suitable form of hardware and/or software on the processing device 22 and memory device 24. The certification and QR code generation program 36 may be stored in a non-transitory computer-readable medium and include computer logic or code configured to enable the processing device 22 to perform various functions as described in the present disclosure.

In some embodiments, the certification and QR code generation program 36 may be executed to thereby allow the processing device 22 to receive, from a requesting entity (e.g., object registration system 12), a Certificate Signing Request (CSR) and vehicle-related information associated with a vehicle. The processing device 22 may then issue a digital certificate to authenticate the vehicle and/or requesting entity. In some embodiments, the processing device 22 may generate a machine-detectable code configured to reference a Uniform Resource Locator (URL) associated with the digital certificate and the vehicle-related information. Then, the certification and QR code generation program 36 enables the processing device 22 to digitally sign the machine-detectable code and send the digitally signed machine-detectable code to the requesting entity.

In some embodiments, the requesting entity may be one or more of a Department of Motor Vehicles (DMV) system, a vehicle registration system, a license plate issuing system, and a vehicle manufacturer. The vehicle-related information may include a Vehicle Identification Number (VIN), vehicle registration information, vehicle title information, vehicle insurance information, driver information, and/or other information. The machine-detectable code may be a visually perceptible code including one or more of a QR code, a barcode, a steganographic object, and a cryptographic image. In alternative embodiments, the machine-detectable code may include one or more of a Radio Frequency Identification (RFID) code, an electronic code, and an electromagnetically transmittable code.

In response to an inquiry from a camera 18 or other detection device upon scanning the machine-detectable code, the certification and QR code generation program 36 may cause the processing device 22 to verify the legitimacy of the digital certificate and the vehicle-related information. The processing device 22 may also be configured to receive the inquiry via the requesting entity or receive the inquiry directly from the detection device.

FIG. 3 is a flow diagram illustrating an embodiment of a method 40 representing the functionality of the certificate management system 14 of FIG. 2. The method 40 includes the step of receiving, from a requesting entity, a Certificate Signing Request (CSR) and object-related information associated with an object, as indicated in block 42. The method 40 also includes the step of issuing a digital certificate to authenticate the object and/or the requesting entity, as indicated in block 44. Also, the method 40 includes the step of digitally signing a machine-detectable code configured to reference a database associated with the digital certificate and the object-related information, as indicated in block 46. The method 40 further includes the step of sending the digitally signed machine-detectable code to the requesting entity, as indicated in block 48.

In some embodiments of the method 40, the object may be an automotive vehicle, wherein the requesting entity may be a DMV system, a vehicle registration system, a license plate issuing system, and/or a vehicle manufacturer. In the embodiment in which the requesting entity is a vehicle manufacturer, the manufacturer can physically apply the machine-detectable code directly on any visually observable part of the vehicle. The object-related information, according to various embodiments, may include observable characteristics and registration data. For example, the observable characteristics may include a) a make and model of the vehicle, b) a manufactured year of the vehicle, c) a type of the vehicle, and/or d) a color of the vehicle. The registration data, for example, may include a) a Vehicle Identification Number (VIN), b) vehicle registration information, c) vehicle title information, d) vehicle insurance information, and/or e) driver information.

The machine-detectable code, according to various implementations, may include a first layer that is visible to human eyes and a second layer that is concealed from human eyes. For instance, the first layer may include a QR code configured to reference the database via a URL and the second layer may include a steganographic image. In response to an inquiry from a detection device (e.g., camera 18) that scans the machine-detectable code, the method 40 may further include the step of verifying the legitimacy of the digital certificate and the object-related information. The method 40 may further include receiving the inquiry via the requesting entity or directly from the detection device. In some embodiments, the method 40 may include generating the machine-detectable code. In alternate embodiments, the generation of the machine-detectable code may be performed by the object registration system 12.

Figure 4:
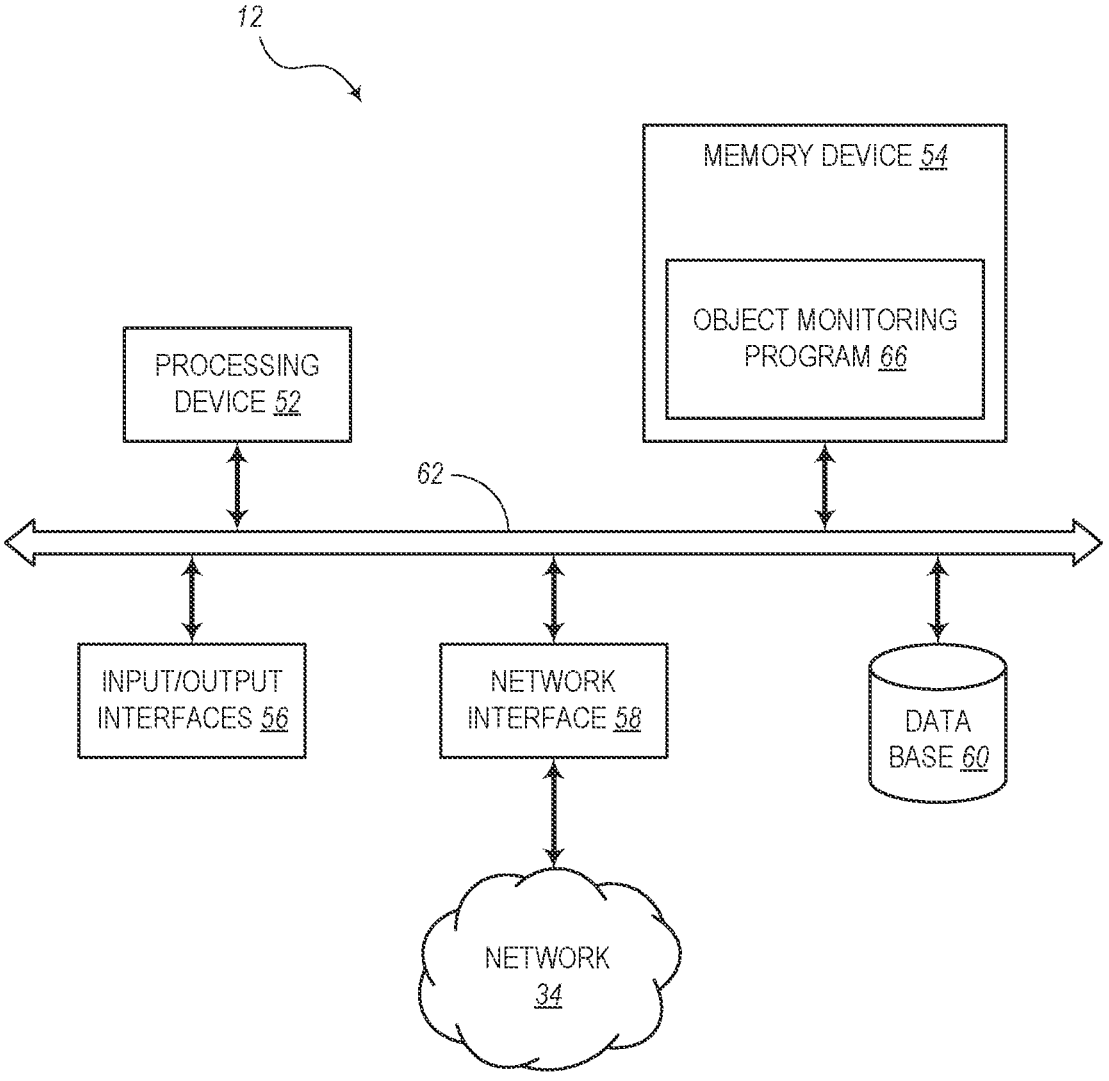
FIG. 4 is a block diagram illustrating the vehicle registration system shown in FIG. 1, according to various embodiments.

FIG. 4 is a block diagram illustrating an embodiment of the object registration system 12 shown in FIG. 1. As shown, the object registration system 12 includes a processing device 52, memory device 54, I/O interfaces 56, network interface 58, and database 60, each in communication with each other via a bus interface 62. The components 52, 54, 56, 58, 60, 62 may have the same general capabilities as the components 22, 24, 26, 28, 30, 32, respectively, shown in FIG. 2. In addition, the object registration system 12 includes an object monitoring program 66, which may be implemented in any suitable combination of hardware, software, and firmware.

The object monitoring program 66 may be stored in non-transitory computer-readable media and may be configured to enable the processing device 52 of the object registration system 12 to send, to a Certificate Authority (CA) (e.g., certificate management system 14), a Certificate Signing Request (CSR) and object-related information (e.g., vehicle-related information) associated with an object (e.g., a vehicle) for obtaining a digitally signed machine-detectable code. The object monitoring program 66 is further configured to enable the processing device 52 to initiate a placement procedure for applying the digitally signed machine-detectable code to the vehicle.

The object registration system may be a vehicle registration system and may be part of a DMV system, a license plate issuing system, or a vehicle manufacturer. The database 60 may be configured to store the vehicle-related information. For example, the vehicle-related information may include a VIN, vehicle registration information, vehicle title information, vehicle insurance information, and/or driver information.

The object monitoring program 66 may further enable the processing device 52 to receive, from a detection system, one or more notices that the digitally signed machine-detectable code has been sensed. The detection system may include the plurality of cameras 18 arranged on or near one or more roadways for monitoring the vehicles. The digitally signed machine-detectable code, in some embodiments, may be a visually perceptible code including a QR code, a barcode, a steganographic object, and/or a cryptographic image. In alternative embodiments, the digitally signed machine-detectable code can include a Radio Frequency Identification (RFID) code, and wherein the detection system can include a plurality of RFID sensors configured to detect the RFID code. In response to receiving the one or more notices, the logic of the object monitoring program 66 may further enable the processing device 52 to verify the authenticity of the digitally signed machine-detectable code with the CA. In response to receiving the one or more notices, the processing device 52 is configured to monitor aspects of the vehicle, an owner of the vehicle, a driver of the vehicle, traffic law violations, vehicle registration issues, child abduction issues, vehicle location information, and license plate fraud.

Figure 5:
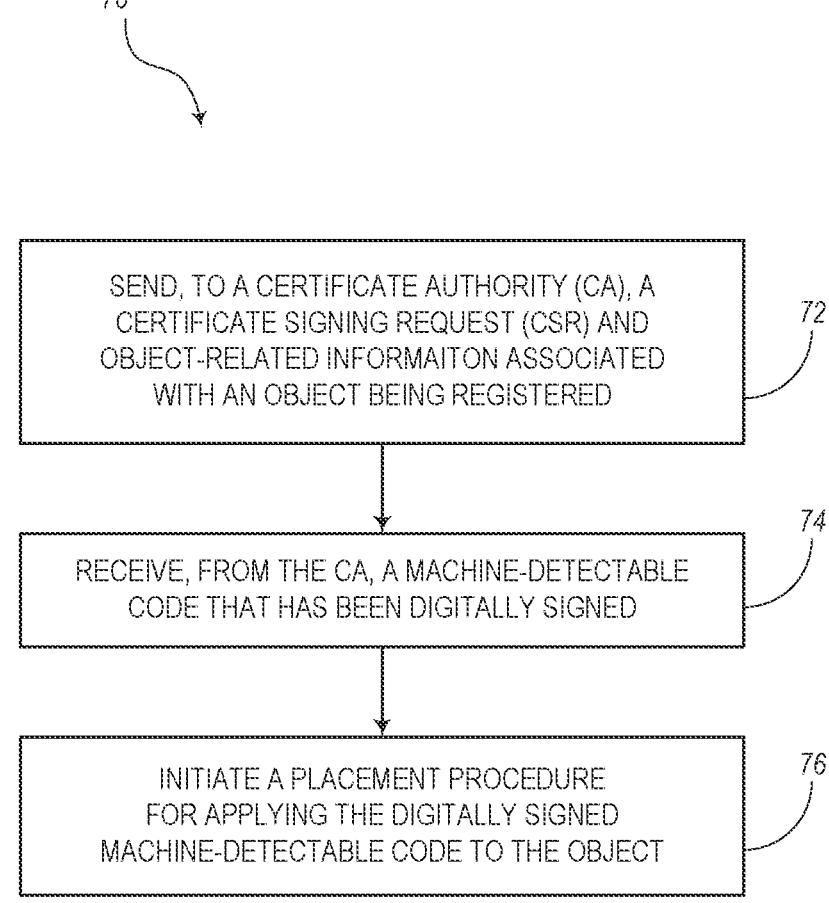
FIG. 5 is a flow diagram illustrating the functionality of the certificate management system of FIG. 4, according to various embodiments.

FIG. 5 is a flow diagram illustrating an embodiment of a method 70 representing the functionality of the object registration system 12 of FIG. 4. As shown, the method 70 includes the step of sending, to a CA, a Certificate Signing Request (CSR) and object-related information associated with an object being registered, as indicated in block 72. The method 70 also includes the step of receiving, from the CA, a machine-detectable code that has been digitally signed, as indicated in block 74. Also, the method 70 includes the step of initiating a placement procedure for applying the digitally signed machine-detectable code to the object, as indicated in block 76.

When the object is a vehicle, the method 70 may represent functionality of the object registration system 12 being a part of a DMV system, a vehicle registration system, a vehicle title system, a license plate issuing system, or a vehicle manufacturer. The database 60 may be configured to store the object-related information. The object-related information, for example, may include observable characteristics and registration data. The observable characteristics may include a) a make and model of the vehicle, b) a manufactured year of the vehicle, c) a type of the vehicle, and/or d) a color of the vehicle. The registration data may include a) a Vehicle Identification Number (VIN), b) vehicle registration information, c) vehicle title information, d) vehicle insurance information, and/or e) driver information. The placement procedure (block 76) may include applying the machine-detectable code on the vehicle itself, on a license plate associated with the vehicle, and/or on a tag attached to a license plate associated with the vehicle.

The method 70 may further include the step of receiving, from a camera, one or more images of the object and the machine-detectable code applied to the object. In response to receiving the one or more images, the method 70 may also include verifying the authenticity of the machine-detectable code with the CA. Again, when the object is a vehicle, and in response to receiving the one or more images, the method 70 may be configured to monitor one or more aspects of the vehicle, an owner of the vehicle, a driver of the vehicle, traffic law violations, vehicle registration issues, child abduction issues, vehicle location information, and license plate fraud.

The machine-detectable code described herein may include a first layer (or first portion) that is visible to human eyes and a second layer (or second portion) that is concealed from human eyes. The first layer, for example, may include a QR code configured to reference a database via a URL, where the second layer may include a steganographic image. The method 70 may also include the step of decoding the machine-detectable code and using the URL to access the database for retrieving pre-stored object information. The pre-stored object information may include observable characteristics, and the method 70 may enable the processing device 52 to compare characteristics observed from one or more images captured of the object and the observable characteristics retrieved from the database.

Figure 6:
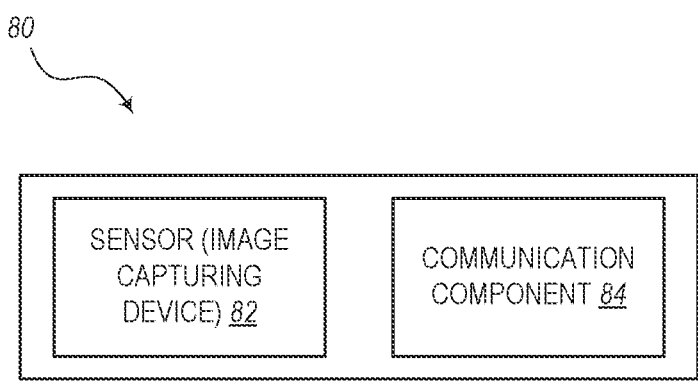
FIG. 6 is a block diagram illustrating one of the detection devices shown in FIG. 1, according to various embodiments.

FIG. 6 is a block diagram illustrating an embodiment of a detection device 80 (e.g., camera 18 shown in FIG. 1). In the implementation with respect to the registration of vehicles, the detection device 80 may be arranged on or near a roadway. As shown, the detection device 80 includes a sensor 82, such as an image capturing device. The detection device 80 is configured to sense one or more machine-detectable codes transported by one or more vehicles travelling along the roadway. The detection device 80 further includes a communication component 84 configured to communicate with a vehicle registration system (e.g., object registration system 12). When the sensor 82 senses a specific machine-detectable code, the communication component 84 is configured to communicate with a CA to verify a digital signature of the specific machine-detectable code.

Again, the one or more machine-detectable codes may be visually perceptible codes including a QR code, a barcode, a steganographic object, and/or a cryptographic image. The sensor 82 may be a camera configured to view the one or more machine-detectable codes. In alternative embodiments, the one or more machine-detectable codes may be Radio Frequency Identification (RFID) codes, and the sensor 82 may be configured as an RFID reader. The detection device 80 may be arranged on one of a sign post, traffic sign, bridge, and patrol vehicle.

Figure 7:
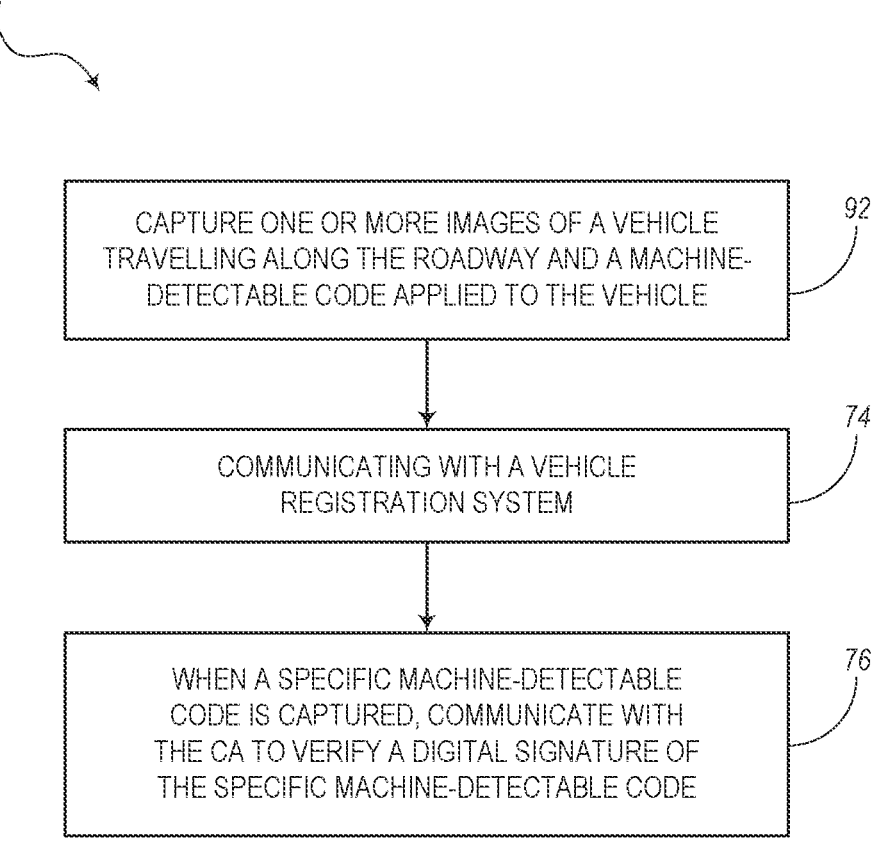
FIG. 7 is a flow diagram illustrating the functionality of the detection device of FIG. 6, according to various embodiments.

FIG. 7 is a flow diagram illustrating an embodiment of a method 90 that may represent the functionality of the detection device 80 of FIG. 6, particularly when the detection device 80 is arranged on or near a roadway. The method 90 includes the step of capturing one or more images of a vehicle travelling along the roadway and a machine-detectable code applied to the vehicle, as indicated in block 92, which may be implemented by the sensor 82 or camera 18. The method 90 also includes the step of communicating with a vehicle registration system, as indicated in block 94. When a specific machine-detectable code is captured (e.g., by the sensor 82), the method 90 further includes the step of communicating with a CA to verify a digital signature of the specific machine-detectable code (e.g., by the communication component 84).

The machine-detectable code, again, may include a first layer that is visible to human eyes and a second layer that is concealed from human eyes. The first layer may include a QR code configured to reference a database via a URL and the second layer may include a steganographic image. The detection device 80 may be arranged on a sign post, a traffic sign, a bridge, or a patrol vehicle.

Thus, the embodiments of the present disclosure have the capability to issue digitally signed QR codes for vehicles to accurately detect and process vehicles for traffic rule violations, fraud, criminal intent, etc. Also, the process can be performed automatically. The conventional systems for detecting traffic violations are typically equipped with Automatic Number Plate Recognition (ANPR) devices, Automatic License Plate Recognition (ALPR) devices, Automated Vehicle Identifier (AVI), and the like. However, these conventional system have the shortcoming where they cannot digitally detect a vehicle. Also, some license plates can be written using non-English alphanumeric characters, which can result in issues. Therefore, the systems and methods of the present disclosure are configured to overcome the issues with conventional systems to digitally detect vehicles anywhere. With random matching of photos of a vehicle, the present systems can even detect if someone is using another's plate. Of note, in additional to being include in police vehicles, etc., the ANPR system can be stationary and included on roads, parking facilities, poles, etc. for also detecting vehicles.

According to embodiments in which a camera is set up in or on a police car or patrol vehicle, the police officer can use the camera to take a picture of the license plate and other aspects of the vehicle and manual compare observed data with previously stored data. In this way, the police officer may detect that the license plate is related to stored information for a red truck, but the car is a blue sedan, for example. Other inconsistencies can be detected.

In some embodiments, the QR code on the automobile or truck will be a URL that points to backend data having pre-stored vehicle data. The URL may point to a digital certificate. Normally, a CA is configured to issue certificates for authenticating electronic devices, users, websites, etc., the CA in the present disclosure is further configured to issue other types of certificates, namely, certificates for vehicles. In addition to autos, trucks, etc., the CA can also issue certificates, according to the present disclosure, for any type of object (e.g., consumer products, containers, etc.)

Cameras 18 may be installed with traffic lights, on overpasses, on posts and beams, on police cars, etc. The cameras 18 may be regular 1080p cameras, higher definition 4k devices, or other types. Any camera is usually sufficient to capture images with enough clarity to allow the software processing for being able to retrieve the QR code and steganography image, even cameras that are currently in use. The cameras can capture images and the software can process the images with high probability and confidence.

Cameras are also used with other various systems for access control. For example, cameras can be used to scan the machine-detectable code to allow the vehicle to have access to certain areas. For example, the systems may include parking lot (or parking garage) management, where a driver is trying to drive into a parking lot or parking garage and automated system may either allow or block the vehicle from entering based on certain information, such as whether or not the vehicle has the proper pass or if adequate payment has been made. Access control can also be implemented for entry into a gated community and/or onto toll roads or expressways.

With toll road access, an RFID tag (or toll pass, may be installed in or on the vehicle and an RFID sensor can sense the tags to charge the vehicle owners for using the toll roads or lanes. Also, according to the embodiments of the present disclosure, cameras are also used to visually detect the vehicle (to determine color, type (such as sedan, SUV, etc.), make and model, etc.). Unfortunately, with conventional system, what could happen is that a person may sell their car but leave the toll tag (e.g., E-ZPass, TxTag, etc.) on the car and get charged for someone else driving on the toll roads. Nevertheless, the embodiments described herein can overcome this issue.

The steganographic feature overcomes another issue with conventional system. Whereas nefarious characters might try to copy an image of a QR code and apply it to their vehicle or alter the letters or number on the plate. In this case, the steganographic image may be corrupted and might be unreadable by the camera. This will result in an error. When an error, inconsistency, mismatch, or other problem is detected, the system can send an alert to the police.

A criminal might also tamper with various license plates, block the view of the plates, alter plates, steal plates from another vehicle, etc. The present systems can detect any inconsistencies or errors when the plates are run. For example, if a criminal steal a plate from a white Honda Civic and puts it on a black Ford F-150, a patrol of the QR code can reveal that the observed vehicle (e.g., black F-150) does not match the stored vehicle information (e.g., white Honda Civic) associated with that plate.

Troopers can drive around an area, pull behind a vehicle, and quickly use the cameras to run a plate. If everything checks out, the trooper can go on to the next vehicle, and so on, continuously checking if any problems are detected. They can drive around and scan the license plates. The system can tell them if there is an issue (e.g., different vehicle color, different type of vehicle, a plate that has been tampered with, no plate detected, obscured or blocked plates, unreadable plates, stolen vehicle, stolen plates, fake QR code, fraud, traffic violations, child abduction, wanted criminal, BOLOs, inaccuracies, errors, etc.).

The certificate can provide a higher level of assurance. Today, people just count on what a license plate is and what car it goes on. A vehicle can have a window sticker that is put on the windshield or back window. The window sticker just indicates that the car has a registration that has expired or not. In this case, the system can revoke a certificate for a car if their registration has expired. In a traffic scenario, the system may charge a driver more for tolls or parking or the fines for traffic violations may be automatically calculated if there is an issue with registration. Also, the systems can notify insurance companies, which could result in higher rates if registration is not renewed in time.

Another use case involves the application of the QR code on other objects 18, such as luggage. If a certificate is issued for luggage at the time that a person is checking in at the airport, pictures can be taken of the luggage and other information can be obtained, such as dimensions, information about the passenger associated with the luggage, travel itinerary, etc. A short term certificate can be issued in this case. Then, the system can identify and track the luggage throughout the trip. This too can raise the confidence level of knowing the digital identity of the luggage through a journey.

Regarding X509 certification, a certificate authority is an entity that stores, signs, and issues digital certificates. This allows others (relying parties) to rely upon signatures or on assertions made about the private key that corresponds to the certified public key. A CA acts as a trusted third party—trusted both by the subject (owner) of the certificate and by the party relying upon the certificate. For certificate authorities, existing individual validation processes involve the use of third-party verification services to validate basic individual information such as first name, last name, professional title, etc. However, these processes do not include the option to validate and incorporate an individual's crypto wallet address. As cryptocurrency becomes more prevalent, there is an increasing need for a secure, verified method of associating crypto wallet addresses with individuals.

Again, the present disclosure includes wallet information in an X509 certificate that is issued from a trusted certificate authority. For example, the wallet information can be included in the Subject Alternative Name (SAN) field of an X509 certificate. The present disclosure enhances the existing individual validation process by incorporating the option for an individual to supply a crypto wallet address. This address is captured, validated, and stored in a database along with the individual's basic information. An X509 personal certificate containing all the individual information, as well as the wallet address, is then generated, which can be used to sign digital content.

X509 certificates are defined by ITU X509, Information technology—Open Systems Interconnection—The Directory: Public-key and attribute certificate frameworks, October 2019, the contents of which are incorporated by reference in their entirety. An X509 certificate binds an identity to a public key using a digital signature. A certificate contains an identity (a hostname, or an organization, or an individual) and a public key (e.g., RSA, DSA, ECDSA, ed25519, etc.), and is signed by a certificate authority. X509 also defines certificate revocation lists, which are a means to distribute information about certificates that have been deemed invalid by a signing authority, as well as a certification path validation algorithm, which allows for certificates to be signed by intermediate CA certificates, which are, in turn, signed by other certificates, eventually reaching a trust anchor.

When a certificate is signed by a trusted certificate authority, or validated by other means, someone holding that certificate can use the public key it contains to validate documents or content digitally signed by the corresponding private key.

In an embodiment, an X509 certificate can be used to digitally sign content. A content signing certificate allows individuals, teams, and organizations to add an electronic, digital signature to a document or other content in a variety of file formats to prove ownership. The digital signature is an encrypted hash of your message that can only be decrypted by someone who has a copy of your public key, which ensures (1) content stays unaltered, (2) the creator's identity is confirmed, and the like.

A digital signature cryptographically binds a digital signature certificate, issued by a trust services provider (TSP), to a document using public key infrastructure (PKI) technology. Digital signatures validate and authenticate signer identity and document integrity, delivering higher levels of assurance that the signer is who they say they are and that the document has not been altered. Digital signatures are ideal for transactions that require higher level of security and are necessary in certain countries and regions where companies are required to comply with legal regulations. In some countries, some forms of digital signatures have legal validity equivalent to handwritten signatures.

In another embodiment, the X509 certificate can be referred to as a personal certificate, i.e., it does not necessarily need to be used to digitally sign content. In a further embodiment, the X509 certificate can be a content credential that includes history and identity data attached to content. A user can view this data when a creator or producer has attached it to content to understand more about what has been done to it, where it has been, and who is responsible. Content credentials are public and tamper-evident, and can include info like edits and activity, assets used, identity info, and more.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:
1. A certificate management system comprising:
a processing device; and
a memory device configured to store a computer program having logic that, when executed causes the processing device to receive, from a requesting entity, a Certificate Signing Request (CSR) and object-related information associated with an object, issue a digital certificate to authenticate one or more of the object or the requesting entity, wherein the digital certificate comprises an X.509 digital certificate and includes at least a portion of the object-related information in a Subject Alternative Name (SAN) field or an extension field, digitally sign a machine-detectable code configured to reference a database associated with the digital certificate and the object-related information, wherein the logic, when executed, further causes the processing device to store, in the database, an association between (i) a certificate identifier of the X.509 digital certificate and (ii) the object-related information, and generate the machine-detectable code to encode (i) a Uniform Resource Locator (URL) that references a verification endpoint associated with the database and (ii) the certificate identifier, and wherein digitally signing the machine-detectable code comprises computing a digital signature over at least the URL and the certificate identifier using a private key associated with the X.509 digital certificate or a certificate authority that issued the X.509 digital certificate, and send the digitally signed machine-detectable code to the requesting entity.

2. The certificate management system of claim 1, wherein the object is a vehicle, and wherein the requesting entity is one or more of a Department of Motor Vehicles (DMV) system, a vehicle registration system, a license plate issuing system, and a vehicle manufacturer.

3. The certificate management system of claim 2, wherein the object-related information includes observable characteristics and registration data, wherein the observable characteristics include one or more of a) a make and model of the vehicle, b) a manufactured year of the vehicle, c) a type of the vehicle, and d) a color of the vehicle, and wherein the registration data includes one or more of a) a Vehicle Identification Number (VIN), b) vehicle registration information, c) vehicle title information, d) vehicle insurance information, and e) driver information.

4. The certificate management system of claim 1, wherein the machine-detectable code includes a first layer that is visible to human eyes and a second layer that is concealed from human eyes.

5. The certificate management system of claim 4, wherein the first layer includes a QR code configured to reference the database via a Uniform Resource Locator (URL) and the second layer includes a steganographic image that encodes a cryptographic digest of at least the URL and the certificate identifier encoded by the first layer, such that tampering with the first layer is detectable by a mismatch between (i) the cryptographic digest decoded from the steganographic image and (ii) a recomputed cryptographic digest of the first layer.

6. The certificate management system of claim 1, wherein, in response to an inquiry from a detection device upon scanning the machine-detectable code, the logic, when executed further causes the processing device to verify legitimacy of the digital certificate and the object-related information.

7. The certificate management system of claim 6, wherein the logic, when executed, further causes the processing device to receive the inquiry via the requesting entity or receive the inquiry directly from the detection device.

8. The certificate management system of claim 1, wherein the logic, when executed, further causes the processing device to generate the machine-detectable code.

9. An object registration system comprising:

a processing device; and a memory device configured to store a computer program having logic that, when executed, cause the processing device to send, to a Certificate Authority (CA), a Certificate Signing Request (CSR) and object-related information associated with an object being registered, wherein the CSR is configured for issuance of an X.509 digital certificate for the object and includes at least a portion of the object-related information in a Subject Alternative Name (SAN) field or an extension field, receive, from the CA, a machine-detectable code that has been digitally signed, wherein the machine-detectable code encodes (i) a Uniform Resource Locator (URL) that references a verification endpoint associated with a database that stores an association between a certificate identifier of the X.509 digital certificate and the object-related information and (ii) the certificate identifier, and wherein the machine-detectable code is digitally signed over at least the URL and the certificate identifier, and initiate a placement procedure for applying the digitally signed machine-detectable code to the object.

10. The object registration system of claim 9, wherein the object is a vehicle, and wherein the object registration system is part of a Department of Motor Vehicles (DMV) system, a vehicle registration system, a vehicle title system, a license plate issuing system, and a vehicle manufacturer.

11. The object registration system of claim 10, further comprising a database configured to store the object-related information, wherein the object-related information includes observable characteristics and registration data, wherein the observable characteristics include one or more of a) a make and model of the vehicle, b) a manufactured year of the vehicle, c) a type of the vehicle, and d) a color of the vehicle, and wherein the registration data includes one or more of a) a Vehicle Identification Number (VIN), b) vehicle registration information, c) vehicle title information, d) vehicle insurance information, and e) driver information.

12. The object registration system of claim 10, wherein the placement procedure includes applying the machine-detectable code on one or more of the vehicle itself, on a license plate associated with the vehicle, or on a tag attached to a license plate associated with the vehicle.

13. The object registration system of claim 9, wherein the logic, when executed, further causes the processing device to receive, from a camera, one or more images of the object and the machine-detectable code applied to the object.

14. The object registration system of claim 13, wherein, in response to receiving the one or more images, the logic, when executed, further causes the processing device to verify authenticity of the machine-detectable code with the CA.

15. The object registration system of claim 13, wherein the object is a vehicle, and wherein, in response to receiving the one or more images, the logic, when executed, further causes the processing device to monitor one or more aspects of the vehicle, an owner of the vehicle, a driver of the vehicle, traffic law violations, vehicle registration issues, child abduction issues, vehicle location information, access control, and license plate fraud.

16. The object registration system of claim 9, wherein the machine-detectable code includes a first layer that is visible to human eyes and a second layer that is concealed from human eyes.

17. The object registration system of claim 16, wherein the first layer includes a QR code configured to reference a database via a Uniform Resource Locator (URL), and wherein the second layer includes a steganographic image.

18. The object registration system of claim 17, wherein the logic, when executed, further causes the processing device to decode the machine-detectable code and use the URL to access the database for retrieving pre-stored object information.

19. The object registration system of claim 18, wherein the pre-stored object information includes observable characteristics, and wherein the logic, when executed, further causes the processing device to compare characteristics observed from one or more images captured of the object and the observable characteristics retrieved from the database.

* * * * *